US011719323B2

(12) United States Patent
Eitelbuss

(10) Patent No.: US 11,719,323 B2
(45) Date of Patent: Aug. 8, 2023

(54) WORM DRIVE

(71) Applicant: MOOG GmbH, Boeblingen (DE)

(72) Inventor: Daniel Eitelbuss, Herrenberg (DE)

(73) Assignee: Moog GmbH, Böblingen (DE)

( * ) Notice: Subject to any disclaimer, the term of this patent is extended or adjusted under 35 U.S.C. 154(b) by 114 days.

(21) Appl. No.: 16/767,460

(22) PCT Filed: Nov. 20, 2018

(86) PCT No.: PCT/EP2018/081933
§ 371 (c)(1),
(2) Date: May 27, 2020

(87) PCT Pub. No.: WO2019/105804
PCT Pub. Date: Jun. 6, 2019

(65) Prior Publication Data
US 2021/0003202 A1 Jan. 7, 2021

(30) Foreign Application Priority Data
Nov. 28, 2017 (DE) ...................... 10 2017 128 182.7

(51) Int. Cl.
*F16H 55/20* (2006.01)
*F16H 55/22* (2006.01)
(Continued)

(52) U.S. Cl.
CPC ........... *F16H 55/22* (2013.01); *F16H 57/022* (2013.01); *F16H 2057/127* (2013.01)

(58) Field of Classification Search
CPC ... F16H 55/22; F16H 57/022; F16H 2057/127
See application file for complete search history.

(56) References Cited

U.S. PATENT DOCUMENTS 3,463,030 A * 8/1969 Nuccel .................... F16H 1/16
74/409
5,245,351 A 9/1993 Chou
(Continued)

FOREIGN PATENT DOCUMENTS

CN 103335064 A 10/2013
DE 249516 A1 9/1967
(Continued)

OTHER PUBLICATIONS

European Patent Office (ISA/EP), International Search Report and Written Opinion of the ISA from International Application No. PCT/EP2018/081933, dated Feb. 13, 2019.

*Primary Examiner* — Zakaria Elahmadi
(74) *Attorney, Agent, or Firm* — Harter Secrest & Emery LLP

(57) ABSTRACT

The invention relates to a worm drive comprising a worm shaft and a first receiving unit. The worm shaft is rotatably mounted in the first receiving unit. Furthermore, the worm drive comprises a worm wheel and a second receiving unit. The worm wheel is rotatably mounted in the second receiving unit. The first receiving unit is arranged on the second receiving unit and the rotatably mounted worm shaft is in contact with the worm wheel of the second receiving unit in order to transmit a torque. Furthermore, the worm drive comprises guide pins for detachably connecting the first receiving unit to the second receiving unit. More particularly, the first receiving unit receives at least part of the guide pins and the second receiving unit is connected to one of the guide pins, preferably to a first end of the guide pin. A spring element is arranged on a second end of the guide pin between the first receiving unit and a fastening means.

20 Claims, 4 Drawing Sheets

Figure 1:
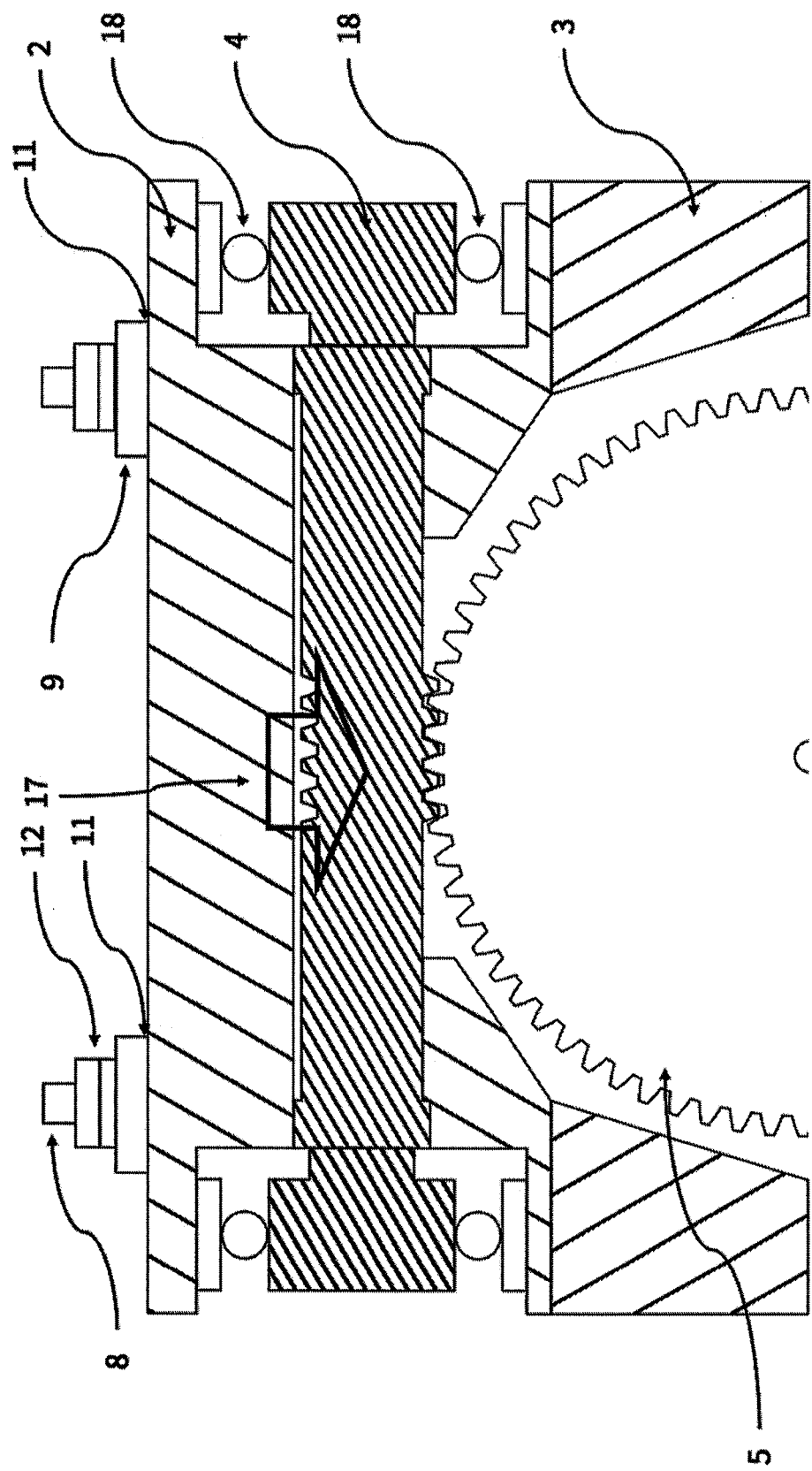

(51) Int. Cl.
*F16H 57/022* (2012.01)
*F16H 57/12* (2006.01)

(56) References Cited

U.S. PATENT DOCUMENTS

| | | |
|---|---|---|
| 2004/0231445 A1 | 11/2004 | Marcus |
| 2014/0202274 A1* | 7/2014 | Durand .................... F16H 1/16 74/425 |
| 2015/0219271 A1 | 8/2015 | Kori |
| 2020/0102002 A1* | 4/2020 | Kirschstein ........... F16H 57/021 |

FOREIGN PATENT DOCUMENTS

| | | | |
|---|---|---|---|
| EP | 1881237 A1 | | 1/2006 |
| JP | 2005256930 A | * | 9/2005 |
| WO | 2007049444 A1 | | 5/2007 |

\* cited by examiner

WORM DRIVE

The present invention relates to a worm drive, in particular a worm drive, with an adjustable pre-stressing of the receiving unit of the worm shaft relative to the receiving unit of the worm wheel.

Worm drives are known in the prior art. Known worm drives have a shaft provided with one or more screw threads, the worm shaft, and a helical gear meshing therein, the worm wheel. The axes of the worm shaft and the worm wheel are usually offset by 90 degrees relative to one another, arranged with intersecting axes and supported, whereby the movement force is transmitted at right angles via a sliding action. As a rule, the worm shaft is the driving element and the worm wheel is the force-receiving driven wheel. This does not rule out design-related exceptions to the rule. Thereby, the worm shaft can be designed to rise to the right or left. When transmitting the movement force, the screw threads of the worm shaft rub on the counter flanks of the worm wheel, as a result of which the mechanical components (worm shaft, worm wheel, bearing) of the worm drive are subject to wear. This effect is even more intensified in worm drive designs with a screw thread, or in worm drive designs with which only one screw thread is in frictional contact during the transmission of force.

In the case of the worm drives known from the prior art, it is disadvantageous that the frictional contact between the worm shaft and the worm wheel causes a strong friction, the so-called sliding friction, which results in a high operating temperature and a low efficiency of the worm drive. The resulting sliding friction is therefore frequently reduced in the state of the art in such a way that different materials, which are efficiently matched to one another, are used for the worm shaft (for example steel) and for the worm wheel (e.g., bronze). The use of identical materials (e.g., only steel) for the worm shaft and the worm wheel leads to a much higher friction and thus also to a lower efficiency and higher wear.

The embodiment of the worm shaft and of the worm wheel of different materials proves disadvantageous in such a way that they thus have different coefficients of thermal expansion, as a result of which the materials behave or expand differently according to the ambient temperature or the operating temperature of the worm drive. The different expansion characteristics of the material of the worm shaft and of the worm wheel, in particular of the toothing in contact relative to one another, can lead to increased wear and/or the jamming of the toothing and thus to damage to the worm drive.

In the prior art, to compensate for the different coefficients of thermal expansion and to ensure the necessary smooth function of the worm drive at different ambient temperatures or operating temperatures of the worm drive, the worm drives are provided with a fixed clearance between the worm shaft and the worm wheel. Due to the fixed clearance between the toothings of the worm shaft and the worm wheel, an increased frictional force between the toothings or a resultant jamming of the worm shaft with the worm wheel is reduced with thermal expansions of the worm wheel. Particularly in the case of material combinations with different coefficients of thermal expansion, greater clearance is required than in the case of material combinations with almost identical coefficients of thermal expansion.

Furthermore, it has been found to be disadvantageous that, in practice, the worm shaft and the worm wheel cannot be produced without manufacturing tolerances, which can lead to an increased frictional contact and thus to increased friction and increased wear and/or jamming. In order to ensure that a smooth function can be ensured precisely in the case of manufacturing tolerances and/or in order to be able to compensate for the manufacturing tolerances and thus to keep the wear of the mechanical components as low as possible, the worm drives are also provided with a fixed clearance between the worm shaft and the worm wheel for this reason.

In this case, a fixed clearance between the worm shaft and the worm wheel proves to be disadvantageous precisely for the use of the worm drive for precise adjustment applications, and thus cannot be used in practice for this field of application. In normal operation, the backlash caused by the spacings between the worm shaft and the worm wheel leads to a gear backlash, with which a movement of the worm wheel is possible when the worm shaft is stationary and thus ultimately permits the use of the worm drive for adjusting applications, if this is possible at all, only to a very limited extent. Normal operation is to be understood here as the operation of the worm drive with firmly set clearance, with which the clearance has the maximum distance for the compensation of thermal expansion and/or manufacturing tolerances, without these having an actual effect.

In addition, with actuating applications, a high positional accuracy is expected, which can only be provided by means of a clearance-free drive/transmission. In addition, the backlash and the torques acting on the toothing lead to increased wear.

Furthermore, worm drives with fixed clearance in relation to necessary adjustments with changing operating parameters, as well as changing ambient and/or operating temperatures, prove to be complex and cost-intensive. In most cases, an increased maintenance and installation effort and special tools are necessary for adjusting the clearance of the worm drive.

The object of the present invention is therefore to provide a worm drive of the type mentioned at the outset which at least partially overcomes the disadvantages of the prior art and is distinguished in particular by an adjustable pre-stressing of the receiving unit of the worm shaft with respect to the receiving unit of the worm wheel, in particular with changing clearance due to manufacturing tolerances and different coefficients of thermal expansion of the materials used for the mechanical components.

According to the invention, the above object is achieved by a worm drive having the features of claim 1. Preferred embodiments and modifications are the subject matter of the dependent claims.

The worm drive in question then comprises a worm shaft and a first receiving unit. The worm shaft is rotatably mounted in the first receiving unit. The worm drive further comprises a worm wheel and a second receiving unit. The worm wheel is rotatably mounted in the second receiving unit. The first receiving unit is arranged on the second receiving unit and the rotatably mounted worm shaft is in contact with the worm wheel of the second receiving unit for transmitting a torque.

Furthermore, the worm drive comprises guide pins for detachably connecting the first receiving unit to the second receiving unit. In particular, the first receiving unit at least receives at least part of the guide pins and the second receiving unit is connected to one of the guide pins, preferably to a first end of the guide pin.

According to the invention, a spring element is arranged at a second end of the guide pin between the first receiving unit and a fastening means.

In this case, a spring element is generally understood to mean a structural element which has the ability to absorb work on a predetermined path under load and to store it wholly or partially as strain energy, or to dispense it completely or partially again when relieved of load.

The worm shaft is a shaft made of one or more screw threads and is generally a special form of helical gear. The angle of the helical toothing is designed such that a tooth turns several times helically about the wheel axis (shaft axis). The tooth of the worm shaft is also referred to as the thread. The worm shaft can be embodied as one thread or multiple threads, whereby the transmission ratio between the worm shaft and the worm wheel can be changed.

In comparison to the worm wheel, the worm shaft is subject to greater wear and is produced, for example, from case-hardened and nitriding steel, in order to obtain better wear resistance. In addition, the wear resistance of the worm shaft can be improved, for example, by an ongoing hardening or nitriding of the surface. This does not rule out further materials and/or processing methods.

The worm shaft is arranged in the first receiving unit and is rotatably supported by a fixed bearing and a movable bearing. This advantageously results in radial support of the worm shaft and guidance in the axial direction. Possible heat-induced changes in the length of the worm shaft are also positively absorbed by the fixed bearing and movable bearing. The worm shaft is preferably supported by inclined ball bearings.

In a simple embodiment, the worm gear is an obliquely toothed spur gear. In order to minimize friction due to frictional contact between the worm shaft and the worm wheel, the worm wheel is made of a different and also softer material than the worm shaft, for example brass or bronze, or a self-lubricating plastic. The worm wheel is rotatably mounted in the second receiving unit. Other materials are not excluded by the exemplary embodiment.

The arrangement of the first receiving unit with the worm shaft above the second receiving unit with the worm gear here represents only one exemplary arrangement. Rather, the second receiving unit can also be arranged above the first receiving unit as a result of construction, use and/or application.

The first receiving unit with the worm shaft and the second receiving unit with the worm wheel must be arranged in such a way that the toothing of the worm shaft and the worm wheel are in contact relative to one another and the teeth interlock, so that a torque is transmitted between the worm shaft and the worm wheel.

The first receiving unit and the second receiving unit are connected by guide pins. The guide pins serve to ensure a movable connection between the first receiving unit and the second receiving unit. This converts the axial movement of the radially supported worm shaft with respect to the worm wheel. The guide pins comprise at their ends a thread for receiving a fastening element and for connecting the guide pin to the second receiving unit.

In one embodiment of the invention, the guide pins are received at least in part by the first receiving unit. The spring element lying between the first receiving unit and the fastening means is fastened by the fastening means via the thread at the second end of the guide pin. The second receiving unit is connected to the guide pin via the thread at the first end of the guide pin.

In an alternative embodiment of the worm drive according to the invention, the second receiving unit receives at least part of the guide pins and the guide pins are connected to the second receiving unit via the thread by means of a fastening means.

In one embodiment of the invention, the spring element arranged at the second end of the guide pin between the first receiving unit and the fastening means at least partially receives the guide pin.

In one embodiment, in particular, the spring element arranged between the first receiving unit and the fastening means is received in a spring housing. The spring housing preferably has an essentially cylindrically symmetrical bending geometry with an internal bushing, which at least partially receives the guide pin. The bushing in the spring housing extends centrally along the axis of rotation of the received guide pin. Furthermore, the spring housing has a recess for receiving the spring element which is distributed around the outer diameter of the spring element. The height of the recess preferably corresponds to the spring deflection of the spring element, with which the spring element preferably experiences the maximum compression and thus acts with maximum spring force on the first receiving unit. This represents, for example, an embodiment of the recess and, corresponding to other types of spring elements, can also vary in height in accordance with the spring element used. The recess is formed on the spring housing side that is in contact with the first receiving unit. The spring housing fastened to the fastening means preferably provides a limitation for the spring deflection of the spring element, whereby the spring force acts on the first receiving unit at maximum pre-stressing and, in the case of torque peaks in the worm drive, provides compression of the spring element up to a set spring deflection.

In one embodiment of the invention, the spring element is selected from a group comprising plate springs, coil springs, cone springs, compression springs, springs made of rubber and/or elastomers and/or polyurethane, metal springs, fiber-reinforced plastic springs, gas springs.

The spring element is preferably designed as a plate spring. Plate springs are flat, conical ring shells which are loaded in the axial direction and are produced both with and without bearing surfaces (DIN2093). Plate springs generally have a constant plate thickness over the entire surface, as a result of which load introduction is distributed uniformly over the upper inner and lower rim edges. Plate springs are advantageously standardized and available in a large number of spring force and dimensions, so that a pre-stressing through the plate spring can be adapted or dimensioned to different application areas of the worm drive. Furthermore, it is advantageous that plate springs have a large spring force with a small spring deflection, as a result of which the design or dimensioning is not affected in comparison with conventional worm drives. Furthermore, with appropriate dimensioning, plate springs are distinguished by a long service life, which minimizes the costs for maintenance and repair.

In one embodiment, the spring element consists of a single plate spring. Given the low space requirement, plate springs can advantageously be composed in many ways of packets of equally layered single plates or also of spring columns of mutually stacked individual plates or packets. By means of spring packets with n identical plates, the individual computational force is advantageously reduced by n times with a constant deflection. By means of spring columns with m mutually layered individual plates, the deflection is advantageously reduced by m times with a constant spring force.

In another particularly preferred embodiment of the present invention, springs, spring elements or spring packets are preferably used which have a working range between 10 N and 1000 N, preferably between 10 N and 100 N and in particular between 30 N and 70 N and have a spring deflection which is between 0.01 mm and 10 mm, preferably between 0.001 mm and 1 mm and in particular between 0.01 and 0.2 mm. In such an operating range, in addition ;to the particularly preferred embodiment of the present invention, the stiffness of the spring element of the spring or of the spring packet lies in a range between 10 N/mm and 200 N/mm, preferably between 20 N/mm and 100 N/mm and in particular between 30 N/mm and 90 N/mm, which can be determined in particular at the so-called ideal point.

Preferably, the spring element is designed such that a distance (preferably an air gap) is formed between the first receiving unit and the spring housing side, which is in contact with the first receiving unit, at maximum pre-stressing and thus with maximum engagement of the toothing of the worm shaft in the toothing of the worm wheel. In the state of maximum pre-stressing, the toothing flanks of the toothing of the worm shaft and of the worm wheel bear against one another, whereby the worm drive is free of clearance in nominal operation.

The distance (preferably an air gap) corresponds to the maximum travel path of the pre-stressing, whereby concentric running deviations and/or the different material heat coefficients as well as torque peaks are advantageously compensated.

For example, the distance between the first receiving unit and the spring housing decreases when a torque peak with a higher force than the spring force acting on the first receiving unit by the spring element occurs. The frictional force between the toothings and thus also the friction is thus advantageously reduced by the compression of the spring element. This minimizes the wear on the worm drive. If the spring force of the pre-stressing is above the force of the torque peak, the first receiving unit and thus the toothing of the worm shaft are pressed into the toothing of the worm wheel and the distance (preferably an air gap) between the first receiving unit and the spring housing is enlarged.

As a result of the pre-stressing preset with the spring element on the first receiving unit, the toothing flanks of the toothing of the worm shaft are placed in the toothing of the worm wheel in such a way that the worm drive is free of clearance virtually in nominal operation, but the friction between the toothing flanks and thus also the wear is reduced to a minimum.

In a further embodiment, the first receiving unit is movable in the direction of extension of the guide pins. The guide pins extend directly on the bearings of the worm shaft and extend from the second receiving unit to the worm wheel in the direction of the first receiving unit with the worm shaft. The first receiving unit is movable along the guide pins in the direction of the second receiving unit. This movement results from the pre-stressing, which acts on the first receiving unit through the spring elements.

By means of a torque acting on the worm shaft or by thermal expansion of the toothing of the worm shaft and/or of the worm wheel, the first receiving unit is moved with the worm shaft acting along the guide pins counter to the acting pre-stressing.

The first receiving unit with worm shaft is moved in the direction of the worm wheel by the disk springs with adjustable support along the guide pins, so that the toothing of the worm shaft engages with a specific pressure in the toothing of the worm wheel and the clearance is reduced to a fixed minimum or a clearance is thereby eliminated. The fixed minimum here lies in a range in which the toothing flanks of the worm shaft and of the worm wheel engage one another and rest relative to one another, but the friction is still in a reasonable range.

It is furthermore advantageous for the first receiving unit with the worm shaft to move with the worm shaft against the direction of action of the pre-stressing from the second receiving unit along the guide pins in the case of torque peaks, so that, in the worm drive, a clearance is established between the tooth flanks which corresponds to a worm drive firmly set with "standard clearance".

When the force acting through the torque peak decreases to a value below the pre-stressing, the first receiving unit with the worm shaft is again moved along the guide bolts in the direction of the second receiving unit with the worm wheel until the toothings engage one another.

One embodiment of the worm drive has at least four guide pins for detachably connecting the first receiving unit to the second receiving unit. Particularly preferably, the worm drive has an even number of guide pins for the detachable connection of the first receiving unit to the second receiving unit. The guide pins hereby enable the movable connection between the first and the second receiving unit, whereby the axial movement of the first receiving unit with the radially supported worm shaft relative to the second receiving unit with the worm wheel is made possible. As a rule, the guide pins are subjected to high mechanical loads and must accordingly have a high strength, in order to ensure the longest possible service life. Advantageously, the high mechanical loads acting on the guide pins are distributed uniformly in the case of an even number of guide pins used, so that the loads are minimized and a long service life is ensured. Furthermore, the use of four guide pins results in a uniform movement and guidance of the first receiving unit, so that possible tilting during the movement is prevented.

In one embodiment of the worm drive, the guide pins for fastening these comprise fastening means, which comprise an adjusting nut and a securing of the adjusting nut. The securing of the adjusting nut is selected from a group containing self-locking adjusting nut, pinned adjusting nut, securing nut adhesive securing, wire securing of the adjusting nut, locknut, plastic securing ring, Locktix, wedge securing disk pair, locking washer or plate and snap ring.

At the second end of the guide bolt, the latter is fastened to the first receiving unit with the aid of a fastening means. The spring housing with the spring element is arranged between the fastening means and the first receiving unit. The fastening means comprises an adjusting nut, which is secured against independent loosening of the connection by a securing means.

In an alternative embodiment of the worm drive according to the invention, the guide pins are connected at the first end thereof to the second receiving unit by a fastening means. In this embodiment, the fastening means comprises an adjusting nut, which is secured against independent loosening of the connection by a securing means.

Preferably, at least half, in particular at least two, of the guide pins used have a sliding bushing. The sliding bushing is a cylindrical component which is inserted into the through-bore provided for the guide pins in the first receiving unit. The sliding bushing is introduced into the through-bore in the first receiving unit in such a way that it can be detached from the first receiving unit in a fixed and non-destructive manner. Advantageously, in each through-bore in which sliding bushings are provided, two sliding bushings are respectively introduced into the first receiving unit at least at the respective end of the bushing provided for the guide pin.

The guide pins are received at least in part by the sliding bushings and themselves do not contain any movable parts. The sliding surface of the sliding bushing is cylindrical, whereby a linear movement of the first receiving unit takes place along the direction of extension of the guide bolts. Advantageously, the sliding bushings provide a precise, low-friction and wear-free guidance of the first receiving unit. Low-friction and wear-free sliding can be facilitated by a lubricating film.

In order to avoid an overdetermination of the mounting of the first receiving unit, only two of the four (for example) guide pins used have a sliding bushing with a clearance fit. The two further guide pins have a given overlap and are preferably not used for guiding the first receiving unit. This exemplary configuration is not a limitation of the inventive worm drive. Rather, the first receiving unit can have an even multiplicity of through-bores for receiving sliding bushings and guide pins. Preferably, each half of the plurality of through-bores has a sliding bushing with a clearance fit and the other half is designed with a fixed overlap.

The guide pins, which have a sliding bushing, are preferably arranged diagonally relative to one another on the first receiving unit and are fastened to the first receiving unit by the fastening means. The diagonal arrangement of the guide pins with sliding bushings enables a uniform movement of the first receiving unit along the direction of extension of the guide pins and reduces forces/stresses acting as well as tilting of the first receiving device.

In a further embodiment, the guide pins, which have a sliding bushing, are arranged alternately with respect to the guide pins in the embodiment without a sliding bushing. In this respect, alternating means that guide pins with or without sliding bushings are respectively configured in an alternating sequence. The guide pin adjacent to a guide pin with a sliding bushing is configured without sliding bushings in this respect. The adjacent guide pins of the guide pins without a sliding bushing are configured with sliding bushings in this respect.

In a further embodiment of the worm drive according to the invention, the radial guide pins with a sliding bushing have a clearance fit, in particular a clearance fit with a narrow running fit or running fit. In the case of a clearance adjustment, the smallest dimension of the inner diameter of the bore in the sliding bushing is always greater, and the same in the limiting case, as the largest dimension of the outer diameter of the radial guide pins. The clearance between the radial guide pins and the sliding bushing is in a range of minimally 0.003 mm and maximally 0.086 mm. The bearing of the radial guide pins ensures that the first receiving unit is guided in the direction of extension of the radial guide bolts.

Fits arise as a result of the relationships of the paired tolerance fields relative to one another and ensure a certain function, for example sliding and guiding tasks, but also interchangeability, with a correspondingly equal nominal spacing. By assigning tolerance field position and tolerance field type (basic tolerance), there is a determination as to which type of fit is present with which clearance or overlap. A distinction is made here between the fitting systems unit bore and unit shaft, for example. The position of the tolerance field to the nominal (zero line) is determined by the fundamental. The fundamental is the upper or lower distance closest to the zero line. The tolerance field position in the case of interior dimensions is designated by capital letters and with lower case letters (ISO 286) in the case of external dimensions.

Guide pins in the sliding bushing design have a narrow running fit clearance fit, for example at least G7/h6 or H7/g6, or a running fit clearance fit, for example at least H7/f7 or F8/h6 or H8/f7 or F8/h9.

In a further embodiment of the worm drive according to the invention, the guide bolts without a sliding bushing have a clearance fit, in particular a clearance fit with a slight running fit or wide running fit. These guide pins do not assume a direct guiding role in the movement of the first receiving unit. Rather, the stability and strength of the connection between the first receiving unit and the second receiving unit is improved. By designing half of the guide pins with a sliding bushing and the other half without a sliding bushing, the overdetermination of the bearing is avoided. The clearance between the radial guide pins and the through-bore in the first receiving unit is in a range of a minimum of 0.1 mm and a maximum of 0.3 mm; the clearance is preferably 0.2 mm.

Guide pins in the embodiment without a sliding bushing have a clearance fit with a slight running fit, for example at least H8/e8 or E9/h9, or a clearance fit with a wide running fit, for example at least H8/d9 or D10/h9 or H11/d9 or D10/h11.

In a further embodiment of the invention, the spring element exerts, via the spring force on the first receiving unit, a pre-stressing in the range from 10 N to 100 N, preferably in a range from 30 N to 70 N, particularly preferably 50 N.

The spring force is to be understood as the force which arises when an elastic and deformable body, for example a plate spring, is pulled apart/stretched or compressed by means of external influences. Due to the influences that occur, an opposite force acts in the plate spring, with which the plate spring is to be reset to its original shape. The strength of the counteracting spring force of the plate spring depends on the distance by which the plate spring is stretched or compressed. The longer the distance, the stronger the counteracting spring force of the plate spring.

If torque peaks act on the worm drive with a force greater than the spring force of the spring element, the first receiving unit is moved along the extension direction of the guide bolts in the direction of the first receiving unit, so that a clearance is established between the toothing flanks of the worm shaft and the worm wheel. In this state, the spring element undergoes compression. When the force acting through the torque peak decreases to a value lower than the spring force, the first receiving unit is moved in the direction of the second receiving unit along the direction of extension of the guide pins. The movement results from the action of the spring force on the first receiving unit and a simultaneous release of the spring element.

Under the pre-stressing, a tension is present in, for example, elastic bodies without external effects, which is introduced into the latter during assembly, for example by means of further means, and exhibits a desired behavior in the event of a load. Advantageously, for example, the spring element can be pre-stressed by means of a stop, whereby the spring element is set to a permanently applied spring force. Thus, for example, plate springs can be adjusted in such a way that they are compressed only at a certain torque peak. The pre-stressing can thus advantageously be adjusted, with the result that the first receiving unit with the worm shaft is moved in the direction of the worm wheel in order to minimize the clearance between the toothing flanks to the extent that the worm drive according to the invention can be used for precise adjusting applications.

Furthermore, the spring deflection of the plate springs and thus the spring force can be adjusted by the stop. This advantageously acts as a result in a consistent pre-stressing on the first receiving unit. The stop can be formed, for example, by shim rings.

Furthermore, the pre-stressed spring element has a spring force which is not overcompressed until specific torque peaks occur, whereby a clearance between the toothing flanks of the worm shaft and the worm wheel is set and the friction between the toothing flanks is reduced.

According to the invention, the applicant has determined the spring force of the spring element in such a way that a pre-stressing is achieved in a range between 1% and 20% of the nominal value of the worm drive, preferably in a range between 5% and 15% of the nominal value of the worm drive, particularly preferably 10% of the nominal value of the worm drive. In this range, the toothing of the worm shaft is pressed into the toothing of the worm wheel, so that the respective toothing flanks abut one another. Thus, the toothing in nominal operation is free of clearance during the effects of vibrations, for example, and the friction acting as a result of the pre-stressing is limited to a reasonable minimum.

In the case of thermal expansions of the worm shaft and/or of the worm wheel and its toothing, a force also acts against the spring force of the spring element. If the acting force is more than the spring force, it is overcompressed and the first receiving unit with the worm shaft is moved away from the worm wheel. In this case, the spring elements experience compression, which takes place to such an extent that the spring elements are moved into the set stop. When the thermal expansions decrease, the first receiving unit is moved by the pre-stressing in the direction of the second receiving unit.

According to the invention, the applicant has determined the spring force of the spring element in such a way that a pre-stressing is provided for the worm gear and this can be operated at thermal expansions in a temperature range between −60° C. to +90° C., in particular in a temperature range between −50° C. to +80° C., preferably in a temperature range of −40° C. to +75° C.

In a further embodiment of the worm drive according to the invention, the spring element provides a spring deflection in a range between 0.01 mm to 0.2 mm, in particular in a range between 0.03 mm to 0.15 mm, preferably in a range between 0.05 mm to 0.1 mm. The clearance between the toothing flanks of the worm shaft and the worm wheel is advantageously minimized by the spring force provided via the spring deflection.

It has become known in the manner according to the invention that the spring deflection of the spring element adjusted to the preferred ranges by means of fitting washers compensates for the rotational deviations of the worm drives indicated by the manufacturers of, for example, 0.03 mm and the simultaneously different thermal coefficients in a temperature range of −40° C. to 72° C. Due to the spring deflection provided in the preferred range, a consistent pre-stressing acts on the first receiving unit, so that the toothing of the worm shaft engages in the toothing of the worm wheel and the worm drive is in the nominal case restricted to a reasonable minimum in the event of effects of vibrations, for example, and the friction acting on pre-stressing. Through the clearance-free operation of the worm drive, with different coefficients of heat at the same time, use of the inventive worm drive is made possible for precise adjustment applications.

In one embodiment of the worm gear, the worm shaft and the worm wheel have a toothing with toothing flanks. In the simplest case, the worm wheel can be designed as an obliquely toothed spur gear. In order to ensure a line contact instead of a point contact between the toothing flanks of the worm shaft and the worm wheel in the worm drive, the toothing of the worm wheel is made hollow.

The toothing of the worm shaft is similar to a thread on a screw. The worm shaft accordingly resembles a spur gear with few very oblique toothings, which are helically wound around the cylindrical worm shaft. A turn of the cylindrical worm shaft thus corresponds to a tooth of the toothing of the worm shaft.

During the engagement movement, the toothing flanks of the worm shaft and of the worm wheel slide on top of each other. In the engagement point, the toothing flanks roll predominantly on one another, but a slight sliding relative to one another also takes place.

According to the invention, the spring element moves the first receiving unit and thus the toothing of the worm shaft in the direction of the toothing of the worm wheel, so that the toothing flanks of the worm shaft engage in the toothing flanks of the worm wheel and the spacing between the toothing flanks is minimized.

The worm shaft and the worm wheel preferably have involute toothing. Further toothing embodiments are not excluded by the exemplary embodiment. The involute toothing has a number of teeth with intermediate tooth gaps. The teeth extend from an inner root diameter to an outside diameter. The root diameter in this case represents the deepest point of the tooth gaps and the outside diameter here represents the highest point of the teeth. The total height of the teeth is divided into the head height and the foot height. The intersection between the head height and the foot height represents the rolling point. At this point, two teeth of the respective toothings form a positive fit. The positive fit is not lost if the worm drive is designed in such a way that the following tooth of the worm shaft and of the worm wheel are already engaged before the engagement of the preceding tooth of the worm shaft and of the worm wheel stops. The inventive embodiment of the worm drive with pre-stressing ensures that the clearance between the toothings of the worm shaft and the worm wheel is designed such that the following tooth of the worm shaft and of the worm wheel are already engaged before the engagement of the preceding tooth of the worm shaft and of the worm wheel stops.

The pre-stressing of the inventive worm drive is preferably designed such that it moves the first receiving unit with the worm shaft in the direction of the second receiving unit in the direction of extension of the guide pins, so that the clearance between the toothing of the worm shaft and the worm wheel is minimized and the teeth of the respective toothing form a positive fit. The pre-stressing advantageously enables the operation of the worm drive in nominal operation without clearance. A preset fixed clearance between the worm shaft and the worm wheel is not necessary.

The pre-stressing acts particularly preferably as a torque damper with torque peaks and with increased friction due to thermal expansions between the mechanical components. In the case of torque peaks, the pre-stressing of the spring element is overcompressed and the first receiving unit moves in the direction of the first receiving unit along the direction of extension of the guide pins. Between the toothings of the worm shaft and the worm wheel, there is a clearance determined in accordance with the invention, so that the friction between the toothing flanks of the worm shaft and the worm wheel is reduced to a minimum.

In particular, thermal expansions are also compensated for by different thermal coefficients in a temperature range from −40° C. to +75° C. In this case, the pre-stressing acts as a compensation in that, due to the increased friction between the toothing flanks of the worm shaft and the worm wheel, the latter is overcompressed due to thermal expansions and thus a minimal clearance is established between the worm shaft and the worm wheel.

In one embodiment of the worm drive according to the invention, the spring housing has an adjustable stop. The adjustable stop limits the maximum compression of the spring element, which it experiences during the thermal expansions of the mechanical components and/or torque peaks. According to the invention, in the case of thermal expansions of the mechanical components and/or torque peaks, the spring force is overcompressed, whereby the first receiving unit with the worm shaft is moved along the direction of extension of the guide pins in the direction of the first receiving unit. In this case, the first receiving unit moves into the set and adjustable stop. With the adjustable pre-stressing according to the invention, the friction acting between the toothing flanks is limited to a reasonable minimum and thus damage or wear is minimized. The adjustment of the stop, and thus the limitation of the deflection, takes place with shim rings. By means of the adjustable stop and the limitation of the maximum deflection of the spring element, the pre-stressing acting on the first receiving unit is also set. When the torque peaks or thermal expansion decrease, the first receiving unit is moved by the pre-stressing in the direction of the second receiving unit along the direction of extension of the guide pins and thus a clearance occurring between the toothing flanks of the worm shaft and of the worm wheel is minimized. Depending on the type of change of the adjustable stop, the worm drive is thus adjustably free of clearance for certain torque peaks and functions at different ambient and/or operating temperatures by compensating for the different temperature coefficients of the mechanical components.

In the context of the invention, it has been found that the use of a shim ring as an adjustable stop of the spring element results in an increased adjustability of the spring force of the spring element corresponding to the requirements of the worm drive for precise adjustment applications. With the insertion of the shim ring as an adjustable stop, cylindrical standard parts are used, which are available cost-effectively and in large numbers, with different inner and outer diameter combinations and thicknesses.

In one embodiment of the worm drive according to the invention, the rotatably mounted worm shaft is arranged in a fixed bearing and in a movable bearing in the first receiving unit. The bearings in a fixed bearing and a movable bearing are used to support the worm shaft radially, to guide it in the axial direction and to positively absorb possible heat-induced changes in length of the worm shaft. When mounting the worm shaft in a combination of fixed bearing and movable bearing, the fixed bearing performs both the radial support and the axial guidance of the worm shaft in both directions along the direction of extension of the worm shaft. In this respect, the fixed bearing is fixed laterally both on the shaft and in the housing. The movable bearings on the respective opposite end of the worm shaft perform only the radial support. The movable bearings permit axial displacements, in order to prevent mutual stressing of the bearings.

Radial bearings are suitable as fixed bearings, which can absorb combined loads, such as grooved ball bearings, two-row or batch-mounted single-row inclined ball bearings, pendulum ball bearings, pendulum roller bearings, mating single-row tapered roller bearings. Toroidal roller bearings, needle bearings and cylindrical roller bearings with an on-board ring are suitable as movable bearings.

The worm drive according to the invention, in particular the embodiments of the worm drive according to the invention disclosed herewith, can be used as a torque damper. Advantageously, therefore, at high torque loads (torque peaks) through the worm wheel on the worm shaft, the mechanism is relieved when the spring force of the pre-stressing and thus of the spring element is overcome. Here, the first receiving unit with the worm shaft rises counter to the spring force of the spring element and thus minimizes the frictional contact between the worm shaft and the worm wheel. The raising of the first receiving unit or the increase in the distance between the worm shaft and the worm wheel depends on the level of the torque peak. If the force of the torque peak is above the force of the pre-stressing with the spring force of the spring element, the spring element is overcompressed and the first receiving unit with the worm shaft moves onto the end stop defined by the adjustable stop. This state then resembles a worm drive firmly set with a "standard clearance" in which only one tooth flank is present. The excessive loading of the mechanical components and thus also wear is thereby minimized.

A worm drive subject to "standard clearance" is understood to mean a worm drive in which the spacing and thus the clearance between the worm shaft and the worm wheel is fixed in accordance with predetermined operating parameters, and adaptations take place in a complex and manual manner with a tool.

By decreasing the force generated by the torque peak below the force exerted by the pre-stressing on the first receiving device, the tooth flanks of the worm shaft are pushed back into the worm wheel. The worm drive thus has a clearance reduced to a minimum again between the tooth flanks of the worm shaft and the worm wheel, wherein the friction between the toothing flanks and thus the wear is reduced to a minimum.

Figure 2:
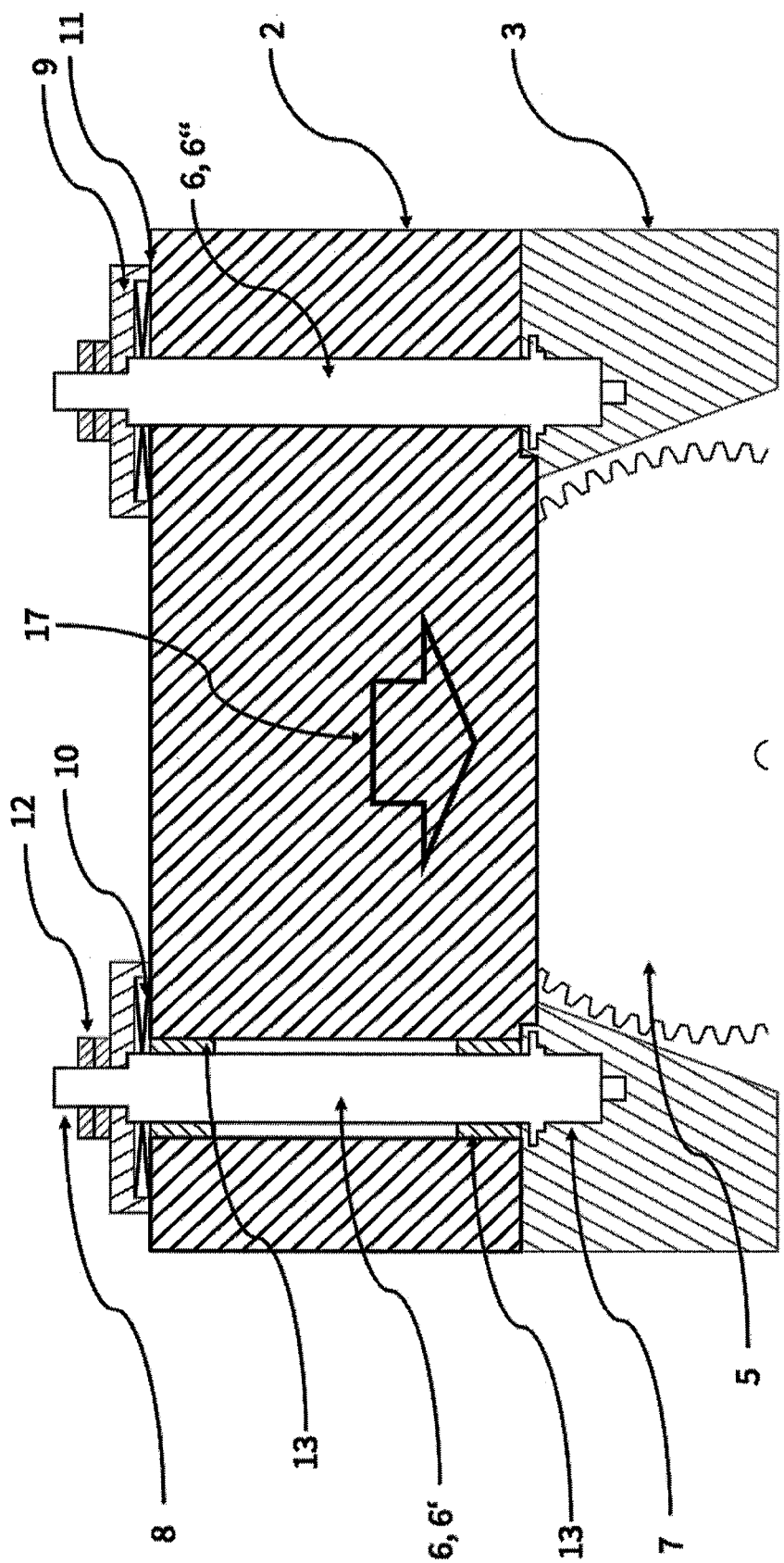
Figure 3:
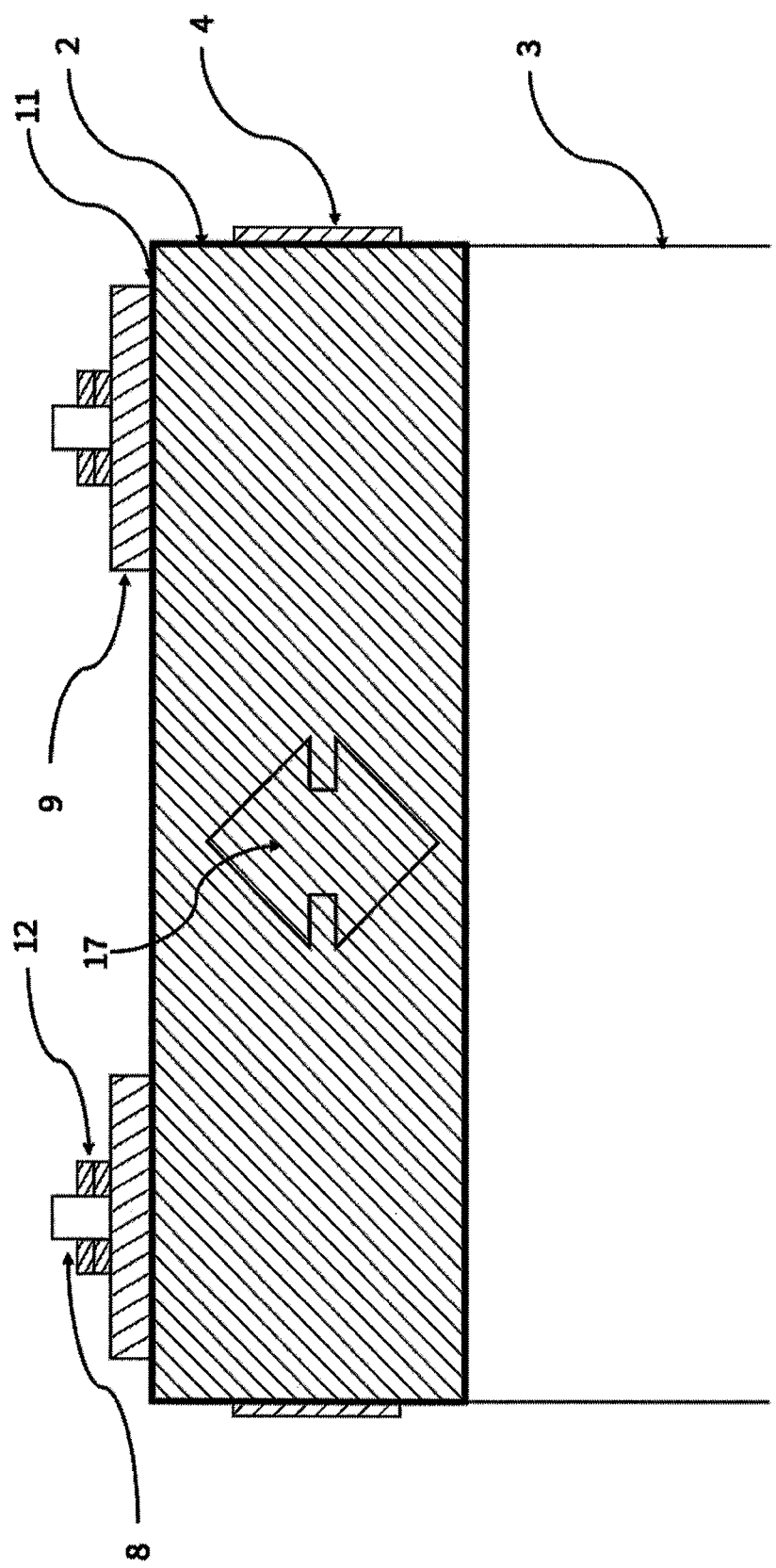
Figure 4:
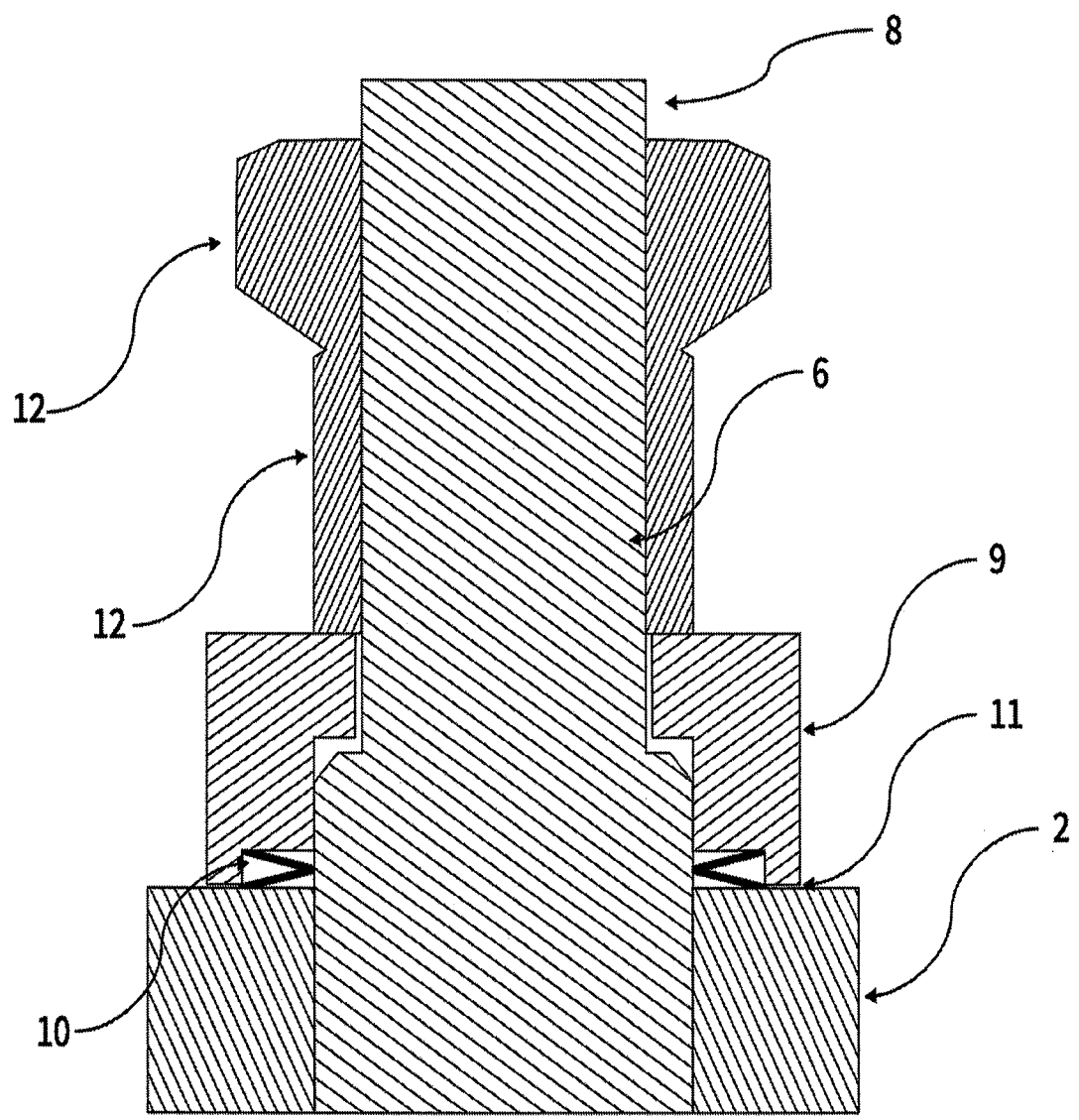

Further features of the present invention result from the following description of preferred exemplary embodiments of the worm drive according to the invention in conjunction with the drawing. These only reflect the invention by way of example and do not constitute a limitation of the inventive idea with regard to modifications. The following are shown:

FIG. 1 a schematic sectional view of an embodiment of the worm drive 1 according to the invention in a side view;

FIG. 2 a schematic sectional view of the guide pins 6 with a sliding bushing 13 of an embodiment of the inventive worm drive 1 in a side view;

FIG. 3 a schematic illustration of an embodiment of the inventive worm drive 1 in a side view;

FIG. 4 a schematic sectional view of an embodiment of the guide pin 6 of the worm drive 1 according to the invention;

FIG. 1 shows the schematic two-dimensional sectional view of an embodiment of the worm drive 1 with a second receiving unit 3, in which the worm wheel 5 is received in a supported manner. The first receiving unit 2 is arranged above the second receiving unit 3. In the first receiving unit 2, the rotatably mounted worm shaft 4 is arranged in a fixed bearing 18 and in a movable bearing 18. The axes of the worm shaft 4 and worm wheel 5 are offset by 90 degrees relative to one another. The first receiving unit 2 is movably connected to the second receiving unit 3 via the guide pin 6. The guide pins 6 are connected at a first end 7 to the second receiving unit 3 and are fastened at a second end 8 via a fastening means 12 to the first receiving unit 2. In an alternative embodiment (not shown), the guide pins 6 can be fastened to the second receiving unit 3 via fastening means 12.

The spring housings 9 which at least partially receive the guide pins 6 are arranged between the first receiving unit 2 and the fastening means 12. The spring housings 9 are in direct contact with the fastening means 12 and are fastened thereto at the second end of the guide pins 8. The fastening means 12 are, for example, a locknut and a fixing nut for securing the locknut. The locknut is arranged above the spring housing 9 and the fixing nut is arranged above it for securing against unintentional release. The spring element 10 is arranged in the spring housings 9 and at least partially accommodates the guide pin 6.

The first receiving unit 2 can be moved in the direction of the second receiving unit 3 by the sum of the plurality of spring elements 10 along the direction of extension of the guide pins. The clearance between the toothings of the worm shaft 4 and the worm wheel 5 is advantageously minimized by the movement of the first receiving unit 2 with the worm shaft 4 in the direction of the second receiving unit 3 with the worm wheel 5. A distance 11 is formed between the spring housing 9 and the surface of the first receiving unit 2 which is in contact with the spring housing 9. The distance 11 between the surface of the first receiving unit 2 in contact with the spring housing 9 and the spring housing 9 results from the spring force 17 resulting from the sum of the spring elements 10, which is directed towards the first receiving unit 2 and brings about a movement of the first receiving unit 2 in the direction of the second receiving unit 3. The distance 11 represents the extent of the movement of the first receiving unit 2 and is maximal with simultaneously minimized clearance between the toothings of the worm shaft 4 and the worm wheel 5.

FIG. 2 shows a schematic two-dimensional representation of an embodiment of the worm drive in a side view with the guide pins 6 according to the invention with slide bushings 13 in a sectional view. FIG. 2 shows the second receiving unit 3 with the worm wheel 4 which is connected to the first receiving unit 2 via the guide pins 6. The second receiving unit is arranged below the first receiving unit 2 and is connected to the first end of the guide pins 6.

In FIG. 2, the guide pins 6 are at least partially received by the second receiving unit 3. In an alternative embodiment, the guide pins 6 can be fastened to the second receiving unit 3 via fastening means 12. The guide pins 6 extend from the second receiving unit 3 in the direction of the first receiving unit 2 and are at least partially received by the first receiving unit 2. The spring housing 9 is arranged above the first receiving unit 2. The spring housing 9 at least partially receives the guide pin 6. The spring housing 9 is fastened to the second end of the guide bolt 8 by fastening means 12. The fastening means 12 are, for example, a locknut and a fixing nut for securing the locknut. The lock nut is arranged above the spring housing 9 and the fixing nut is arranged above it for securing against unintentional release. The first receiving unit 2 has sliding bushings 13 in the bushing provided for receiving the guide pins 6'. The sliding bushings 13 are embedded in the first receiving unit 2 in such a way that the ends pointing towards the outside of the first receiving unit 2 for the sliding bushings 13 essentially end with the lower and upper surfaces of the first receiving unit 3. The lower surface is to be understood as the side of the first receiving unit 2 facing the second receiving unit 3 and the upper surface is to be understood as the surface of the first receiving unit 2 which is in contact with the spring housing 9.

The embodiment illustrated in FIG. 2 is not intended to be limiting for further embodiments. For example, other embodiments may also include three or a plurality of slide bushings at positions different from the slide bushings shown in FIG. 2. The sliding bushings 13 at least partially receive the guide pin 6'. The sliding surface of the sliding bushing 13 is cylindrical, as a result of which a linear movement of the first receiving unit 2 takes place along the direction of extension of the guide bolts 6, 6', 6". Advantageously, the sliding bushings 13 provide a precise, low-friction and wear-free guidance of the first receiving unit 2. In order to avoid an overdetermination of the mounting of the first receiving unit 2, only two guide pins 6' of the guide pins 6 used have a sliding bushing 13 with a clearance fit. The two further guide pins 6" have a given overlap and are not used for guiding the first receiving unit 2. Preferably, the diagonally opposite guide pins 6 are a combination of two guide pins 6' provided with sliding bushings. The guide pins 6" are correspondingly also arranged diagonally relative to one another. In embodiments with a plurality of guide pins 6 greater than four, these are distributed accordingly, so that an overdetermination of the bearing is avoided.

In the embodiment shown in FIG. 2, the side of the spring housing 9 which is in contact with the first receiving unit 2 has a material recess, preferably in the outer diameter of the spring element 10, for receiving the spring element 10. The spring element 10, preferably a plate spring, is accommodated in the material recess. Each guide pin 6 is preferably received at least partially by a spring housing 9 and thus by a spring element 10. As a result, an overall evenly directed spring force acts on the first receiving unit 2, whereby the latter is moved in the direction 17 of the second receiving unit 3 along the direction of extension of the guide pins 6.

FIG. 3 shows a schematic illustration of an embodiment of the inventive worm drive 1 with the guide pins 6 according to the invention and the spring elements 10 at a distance 11 in a side view. In FIG. 3, the first receiving unit 2 is arranged above the second receiving unit 3 and they are connected to one another via guide pins 6. The first receiving unit 2 is connected to the guide pins 6 via fastening means 12. The spring housings 9 with the spring elements 10 (not shown) are arranged between the fastening means 12 and the first receiving unit 2. A spring force acts on the first receiving unit 2 through the spring elements 10, whereby the latter is moved in the direction 17 of the second receiving unit along the direction of extension of the guide pins 6. As a result of the action of torque peaks through the worm wheel on the worm shaft and/or thermal expansions, the spring force of the spring element 10 is overcompressed and the first receiving unit 2 moves along the direction of extension of the guide pins 6 in the direction 17 of the spring housings 9, whereby the spacing 11 is minimized. After the torque peaks and/or thermal expansions have subsided and a force action is less than the pre-stressing, the first receiving unit 2 is moved in the direction of the receiving unit 3 by the spring force, whereby the distance 11 is enlarged. The first receiving unit 2 executes a movement 17, which lies in the maximum extension range of the distance 11. This is the case when the first receiving unit 2 is moved in the direction of the second receiving unit 3 through the maximum pre-stressing.

FIG. 4 shows a schematic two-dimensional sectional view of an embodiment of the guide pin 6 of the worm drive 1 according to the invention with the first receiving unit 2 and a second end of the guide pin 8, wherein the guide pin 6 is at least partially accommodated by the first receiving unit 2. The guide pin 6 extends from the second receiving unit 3 (not shown) in the direction of the first receiving unit 2. The spring housing 9 is arranged above the first receiving unit 2. The spring housing 9 at least partially receives the guide pin 6. On the side of the spring housing 9 which is in contact with the first receiving unit 2, the spring housing 9 has a material recess, preferably in the outer diameter of the spring element 10. The material recess is designed in height (direction of extension along the direction of extension of the guide bolts 6) and diameter in such a way that it receives the spring element 10, preferably a plate spring, whereby a pre-stressing is provided on the first receiving unit 2.

In FIG. 4, the spring element 10 received in the material recess is shown in maximum relaxation, so that a pre-stressing acts in the direction of extension of the guide bolts 6 in the direction of the first receiving unit 2 and moves the first receiving unit 2 in the direction of the second receiving unit 3 (not shown). This forms a distance 11, preferably an air gap, between the first receiving unit 2 and the spring housing 9. By the action of torque peaks through the worm wheel on the worm shaft and/or thermal expansions, the spring force of the spring element 10 is overcompressed and the spring element 10 is compressed or tensioned. The first receiving unit 2 moves in the direction of the spring housing 9 along the direction of extension of the guide pins, whereby the distance 11 between the spring housing 9 and the first receiving unit is minimized and the first receiving unit 2 moves onto the end stop defined by the adjustable stop. This simultaneously represents the end stop for the movement of the first receiving unit 2 in the direction of the spring housing 9. Between the toothings of the worm shaft 4 (not shown) and the worm wheel 5 (not shown) there is thus a clearance determined in accordance with the invention, so that the friction occurring between the toothing flanks of the worm shaft and the worm wheel is reduced to a minimum. After the torque peaks and/or the thermal expansions have subsided, the spring element 10 is relaxed, as a result of which a pre-stressing through the spring force of the spring element 10 acts on the first receiving unit 2 and moves the latter along the direction of extension of the guide pins 6 in the direction of the second receiving unit 3 (not shown). The worm drive 1 thus has a clearance reduced to a minimum again between the tooth flanks of the worm shaft 4 (not shown) and the worm wheel 5 (not shown) and can thus be used for precise adjustment applications, wherein the friction between the toothing flanks and thus the wear is reduced to a minimum. In addition, the spring housing 9 has the adjustable stop 16 (not shown). Furthermore, the spring housing 9 is fastened to the second end of the guide pin 8 by the fastening means 12. The fastening means 12 are, for example, a locknut and a fixing nut for securing the locknut. The lock nut is arranged above the spring housing 9 and the fixing nut is arranged above it for securing against unintentional release.

LIST OF REFERENCE SIGNS

1 Worm drive
2 First receiving unit
3 Second receiving unit
4 Worm shaft
5 Worm wheel
6 Guide pin
7 First end of the guide pin
8 Second end of the guide pin
9 Spring housing
10 Spring element
11 Distance
12 Fastening means
13 Sliding bushing
14 Pre-stressing
15 Toothing
16 Stop
17 Movement directions of the first receiving unit
18 Mounting of the worm shaft

The invention claimed is:

1. A worm drive comprising:
a worm shaft and a first receiving unit, wherein the worm shaft is rotatably mounted in the first receiving unit;
a worm wheel and a second receiving unit, wherein the worm wheel is rotatably mounted in the second receiving unit, the first receiving unit is arranged on the second receiving unit, and the rotatably mounted worm shaft of the first receiving unit is in contact for transmitting a torque to the worm wheel of the second receiving unit;
a plurality of guide pins for detachably connecting the first receiving unit to the second receiving unit, wherein the first receiving unit receives at least part of the guide pins and the second receiving unit is connected to a first end of the guide pins;
a spring element arranged on a second end of the guide pins between the first receiving unit and a fastener;
wherein the worm shaft moves relative to the worm wheel with movement of the first receiving unit in a direction of extension of the guide pins;
the worm drive having an even number of guide pins for detachably connecting the first receiving unit to the second receiving unit, wherein at least half of the guide pins have a sliding bushing; and
at least two of the plurality of guide pins arranged diagonally relative to one another on a plane of the first receiving unit.

2. The worm drive according to claim 1, wherein the spring element is received in a spring housing.

3. The worm drive according to claim 1, wherein the spring element is selected from the group consisting of a plate spring, a coil spring, a conical spring, a compression spring, a spring made of rubber, elastomers, and/or polyurethane, a metal spring, a fiber-reinforced plastic spring, and a gas spring.

4. The worm drive according to claim 2, wherein a distance is formed between the first receiving unit and the spring housing.

5. The worm drive according to claim 1, wherein the plurality of guide pins comprise at least four guide pins for detachably connecting the first receiving unit to the second receiving unit.

6. The worm drive according to claim 1, wherein the fastener comprises an adjusting nut.

7. The worm drive according to claim 1, wherein at least two of the guide pins have a sliding bushing.

8. The worm drive according to claim 7, wherein the guide pins which have the sliding bushing are arranged diagonally relative to one another on the first receiving unit and are fastened by the fastener.

9. The worm drive according to claim 1, wherein the guide pins with a sliding bushing have a clearance fit with a narrow running fit or a running fit.

10. The worm drive according to claim 9, wherein the guide pins without a sliding bushing have a clearance fit with a slight running fit or a wide running fit.

11. The worm drive according to claim 1, wherein the spring element exerts, via a spring force on the first receiving unit, a pre-stressing in the range from 10 N to 100 N.

12. The worm drive according to claim 1, wherein the spring element provides a spring deflection in a range between 0.01 mm and 0.2 mm.

13. The worm drive according to claim 1, wherein the worm shaft and the worm wheel have a toothing with toothing flanks.

14. The worm drive according to claim 1, wherein the spring element moves the toothing of the worm shaft in the direction of the toothing of the worm wheel, wherein the toothing flanks of the worm shaft engage in the toothing flanks of the worm wheel, so that the spacing between the toothing flanks is minimized.

15. The worm drive according to claim 1, wherein the spring housing has an adjustable stop.

16. The worm drive according to claim 15, wherein the adjustable stop is a shim ring.

17. The worm drive according to claim 1, wherein the rotatably mounted worm shaft is arranged in a fixed bearing and in a movable bearing.

18. The worm drive according to claim 6, wherein the adjusting nut is selected from the group consisting of a self-securing adjusting nut and a locknut.

19. The worm drive according to claim 6, wherein the adjusting nut is secured by at least one of a pin, adhesive, wire, a plastic securing ring, a LOCTIX screw lock, a wedge securing disk pair, a locking washer or plate, and a snap ring.

20. A worm drive comprising:
a first receiving unit;
a worm shaft rotatably mounted in the first receiving unit;
a second receiving unit;
a worm wheel rotatably mounted in the second receiving unit, wherein the first receiving unit is arranged on the second receiving unit and the rotatably mounted worm shaft is operatively arranged to transmit a torque to the worm wheel;
a plurality of guide pins for detachably connecting the first receiving unit to the second receiving unit, wherein the first receiving unit receives at least part of the guide pins and the second receiving unit is connected to a first end of the guide pins;
a spring element arranged on a second end of the guide pins between the first receiving unit and a fastener; and
a spring housing arranged on the second end of the guide pins and at least partially enclosing the spring element, the spring element being arranged between the spring housing and the first receiving unit;
wherein the worm shaft moves relative to the worm wheel with movement of the first receiving unit longitudinally along the guide pins.

* * * * *